US008923875B2

(12) United States Patent
Frederiksen et al.

(10) Patent No.: US 8,923,875 B2
(45) Date of Patent: Dec. 30, 2014

(54) CELL CONFIGURATION FOR SELF-ORGANIZED NETWORKS WITH FLEXIBLE SPECTRUM USAGE

(75) Inventors: Frank Frederiksen, Klarup (DK); Istvan Zsolt Kovacs, Aalborg (DK); Klaus Ingemann Pedersen, Aalborg (DK); Vinh Van Phan, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 479 days.

(21) Appl. No.: 12/934,439

(22) PCT Filed: Mar. 24, 2009

(86) PCT No.: PCT/EP2009/002150
§ 371 (c)(1), (2), (4) Date: Nov. 1, 2010

(87) PCT Pub. No.: WO2009/118155
PCT Pub. Date: Oct. 1, 2009

(65) Prior Publication Data
US 2011/0053601 A1 Mar. 3, 2011

(30) Foreign Application Priority Data

Mar. 28, 2008 (EP) .................................. 08006110

(51) Int. Cl.
| | | |
|---|---|---|
| H04W 72/00 | (2009.01) | |
| H04W 4/00 | (2009.01) | |
| H04W 24/00 | (2009.01) | |
| H04W 40/00 | (2009.01) | |
| H04W 24/02 | (2009.01) | |
| H04J 11/00 | (2006.01) | |
| H04W 84/04 | (2009.01) | |

(52) U.S. Cl.
CPC ........... H04W 24/02 (2013.01); H04J 11/0093 (2013.01); H04W 84/045 (2013.01)
USPC ........ 455/451; 455/422.1; 455/423; 455/424; 455/435.1; 455/446; 455/447; 455/450; 455/452.1; 455/454

(58) Field of Classification Search
USPC ................... 455/422.1–424, 435.1, 446–455; 370/331
See application file for complete search history.

(56) References Cited

U.S. PATENT DOCUMENTS

| | | | |
|---|---|---|---|
| 6,615,040 B1 | 9/2003 | Benveniste | .................... 455/423 |
| 6,729,929 B1 * | 5/2004 | Sayers et al. | .................. 455/446 |

(Continued)

FOREIGN PATENT DOCUMENTS

| | | |
|---|---|---|
| EP | 1 251 704 A1 | 10/2002 |
| WO | WO 2008/082587 A1 | 7/2008 |

OTHER PUBLICATIONS

"Spectrum Sharing for Next Generation Wireless Communication Networks", Sanjay Kumar, Aalborg University, Denmark (5 pages).

(Continued)

Primary Examiner — Jinsong Hu
Assistant Examiner — Dung Hong
(74) Attorney, Agent, or Firm — Harrington & Smith

(57) ABSTRACT

The present invention relates to methods and apparatuses for controlling cell configuration in a cellular network, wherein a cell identity and a local cell spectrum resource entity or profile are assigned to an access device in response to a result of sensing a local radio environment at said access device to detect possible neighbor cells. The assigned local cell spectrum resource entity or profile is used to allocate cell spectrum resource from a shared multi-operator spectrum to said access device.

28 Claims, 4 Drawing Sheets

(56) References Cited

U.S. PATENT DOCUMENTS

| | | | | |
|---|---|---|---|---|
| 7,827,270 | B2* | 11/2010 | Thomson et al. | 709/223 |
| 2006/0172707 | A1* | 8/2006 | Stern-Berkowitz et al. | 455/67.11 |
| 2007/0105585 | A1* | 5/2007 | Lee et al. | 455/525 |
| 2007/0117537 | A1* | 5/2007 | Hui et al. | 455/405 |
| 2008/0076412 | A1* | 3/2008 | Khetawat et al. | 455/432.1 |

OTHER PUBLICATIONS

Samsung, "Consideration on eNB Deployment Scenarios for SCSO", R3-071256, 3GPP TSG RAN WG #56bis, Jun. 13-14, 2007, Sophia Antipolis, France, 3 pgs.

Aricent, "Challenges in Deployment of UMTS/HSPA Femtocell", Feb. 2008, 8 pgs.

* cited by examiner

CELL CONFIGURATION FOR SELF-ORGANIZED NETWORKS WITH FLEXIBLE SPECTRUM USAGE

FIELD OF THE INVENTION

The present invention relates to cell configuration methods and apparatuses for supporting self-organization and/or flexible spectrum usage in advanced mobile communication networks, such as—but not limited to—Universal Mobile Communication System (UMTS), Long Term Evolution (LTE) networks, or International Mobile Telecommunications-Advanced (IMT-A) systems.

BACKGROUND OF THE INVENTION

Home base stations (e.g. home NodeBs or home eNodeBs), local-area base stations (e.g. local-area NodeBs or local-area eNodeBs), femto eNodeBs or any other type of home access device (in the following referred to as "HNB") or local-area access device (in the following referred to as "LNB") have become a widely discussed topic. As an example, when deployed in homes and offices, HNBs allow subscribers to use their existing handsets—in a building—with significantly improved coverage and increased broadband wireless performance. Moreover, Internet Protocol (IP) based architecture allows deployment and management in virtually any environment with broadband Internet service.

With the introduction of High Speed Downlink Packet Access (HSDPA) in various commercial networks, operators noticed quite substantial date rate, i.e. capacity, consumption of single users. Those are in most cases users staying at home and using a HSDPA data card or the like for substantial Internet surfing like downloading movies etc. However, existing mobile communication systems (e.g. Global System for Mobile communications (GSM), Wideband Code Division Multiple Access (WCDMA/HSDPA) are not optimal suited for such home-based application, as those were developed and defined under the assumption of coordinated network deployment, whereas HNBs are typically associated with uncoordinated and large scale deployment.

In HNB scenarios, it is generally assumed that an end user is buying a cheap (Wireless Local Area Network (WLAN) like) product and also installs this physical entity at his home. Such a HNB would then provide coverage/service to the terminals registered by the owner of the HNB. Still the HNB would use the same spectrum owned by the operator and as such at least partly the spectrum the operator is using to provide macro cell coverage to the area where the HNB is located in.

Moreover, sharing and pooling properties may be provided in the core network, where several operator's core networks are attached to the same access node or foreign mobile terminal devices or user equipments (UEs) roam into a HNB or LNB nominally "owned" by a certain operator.

A self-organization network (SON) is based on a network concept with functionalities enabling and supporting capabilities in which certain network entities can change or can be changed in their configuration without manual intervention. This concept, as such, is rather broad, ranging from a self-tuning of certain network configuration parameters for performance optimization purposes to a self-reorganizing of certain parts of the network affecting network structures and operations. In this regard, enabling plug-and-play access devices in a multi-operator spectrum-sharing environment is one of the ultimate challenges. This may be advantageous for possible mass-deployment of HNBs or LNBs in LTE and IMT-A systems.

Moreover, flexible spectrum use (FSU) refers to any spatially and/or temporarily varying use of a radio spectrum, i.e., not based on exclusive harmonized spectrum assignments for each system and operator. The term "radio spectrum" herein can be considered as a multidimensional entity, not just about the carrier frequency and system bandwidth. Dimensions of radio spectrum may include for example space, time, polarization, frequency channel, power of signal transmission and interference. The static, command-and-control management of spectrum has led to barriers to accessing the spectrum in various dimensions. FSU aims to break these barriers in one or more of the dimensions. This also includes the so-called spectrum sharing (SS). SS refers to situations in which different radio (sub-) systems utilize the same part of spectrum in a coordinated or uncoordinated manner. These radio (sub-) systems, typically, are based on similar technology and offer similar services, e.g., different operators sharing the same spectrum by utilizing dynamic channel assignment from a common pool of channels. However, SS between a primary system, such as a fixed satellite service (FSS) system, and a secondary system, such as an advanced mobile cellular system which is allowed to use the spectrum resources of the FSS system wherever and whenever tolerable, is a probable scenario.

However, in connection with the above SON and FSU concepts, inter-cell and co-channel interference problems affecting the operation of individual neighboring cells and, in particular, common and control channels which are essential to the cell operation and may have predefined semi-static allocation, must be resolved. These problem are even more crucial when considering plug-and-play nature of HNBs and/or LNBs in SON in single RAT multi-operator spectrum-sharing environments. Furthermore, initial setup, reset or removal of a plug-and-play HNB or LNB must ensure minimum impact on the operating network environment, i.e., avoiding chain-reaction of forced network reconfigurations over a sizable number of cells around the given HNB or LNB.

The development of SON for advanced mobile cellular networks has been so far focusing on self-optimization aspects with centralized network planning and operation and maintenance (O&M) support, rather than self-organization. The aspects and impacts of multi-operator environment in which different networks of different operators can use the same radio access technology and be deployed in overlapping spectrum and service area, have not been addressed yet.

Furthermore, SON methods and mechanisms which have been proposed for 3GPP LTE are involved around the so-called automatic neighbor relation (ANR) concept and optimization of neighbor cell list (NCL). These, in turn, are based on O&M network configuration and terminal measurements of neighbor cells.

SUMMARY

It is an object of the present invention to provide a simple and robust cell configuration scheme to facilitate efficient SON and/or FSU for advanced cellular systems.

This object is achieved at network access level by a method of controlling cell configuration in a cellular network, said method comprising:
  assigning a cell identity and a local cell spectrum resource entity or profile to an access device in response to a result of sensing at an access device a local radio environment to detect possible neighbor cells;

wherein said assigned local cell spectrum resource entity or profile is used to allocate cell spectrum resource from a shared multi-operator spectrum to said access device.

Furthermore, at network control level, the above object is achieved by a method of controlling cell configuration in a cellular network, said method comprising:
providing a local cell spectrum resource entity or profile for allocating cell spectrum resource from a shared multi-operator spectrum;
receiving at said local cell spectrum resource entity or profile an information indicating a cell identity assigned to an access device; and
assigning cell spectrum resource at said local cell spectrum resource entity or profile to said cell identity.

Additionally, at network access level, the above object is achieved by an apparatus for controlling cell configuration in a cellular network, said apparatus comprising:
sensing means for sensing a local radio environment of an access device to detect possible neighbor cells; and
assigning means for controlling assignment of a cell identity and at least one of a plurality of local cell spectrum resource entities or profiles to said access device in response to the sensing result of said sensing means.

Moreover, at central network control level, the above object is achieved by an apparatus for controlling cell configuration in a cellular network, said apparatus comprising:
sensing means for sensing a local radio environment of an access device (10) to detect possible neighbor cells; and
assigning means for controlling assignment of a cell identity and at least one of a plurality of local cell spectrum resource entities or profiles to said access device in response to the sensing result of said sensing means.

In addition, at local network control level, the above object is achieved by an apparatus for controlling cell configuration in a cellular network, said apparatus comprising:
assigning means for assigning a cell identity and at least one of a plurality of local cell spectrum resource entities or profiles to an access device in response to a received sensing result indicating possible neighbor cells of a local radio environment of said access device;
wherein said assigned local cell spectrum resource entity is used to allocate cell spectrum resource from a shared multi-operator spectrum to said target cell.

Accordingly, a framework and related mechanisms for providing SON and FSU can be provided, irrespective of the number of operators sharing a certain bandwidth in a service area. Cell configuration can be handled upon insertion, reset, reactivation or removal of an access device (e.g. in mass deployment of plug-and-play HNB or LNB). An implicit coordination between cells in a local network neighborhood in term of basic cell resource allocation and sharing. Thereby, a prion conflict avoidance can be ensured for resolving problems of inter-cell and co-channel interference. This, in turn, provides an effective means for accommodating HNBs or LNBs into the local networking environment, whereas in conventional cellular systems explicit coordination with extensive network planning and centralized control is required for access device deployment causing significant overhead. addresses a framework and related mechanisms for providing SON and FSU, irrespective of the number of operators sharing a certain bandwidth in a service area.

The proposed solution also provides backward compatibility, that is, adaptability to existing network structures of the systems of interest with minimum changes required, yet allowing for decentralizing operator dependent network planning and O&M functionalities needed for configuring the network system in an optimal fashion.

The sensing and assigning at the network access level may be initiated upon at least one of insertion, reset, reactivation, and removal of an access device. The assigned cell spectrum resource may comprises at a least structural arrangement and a resource allocation of cell-specific common and control channels. More specifically, in an example, the cell spectrum resource may comprises at least one of channel format, transmit power, system parameters, and information about dedicated and shared spectrum resources assigned to a cell of said access device.

The proposed local cell spectrum resource entity or profile may be designated based on frequency reuse principles. However, still, resource allocation to the local cell spectrum resource entity or profile may allow utilization of an entire system spectrum or bandwidth at a given cell. Furthermore, the proposed local cell spectrum resource entities or profiles may be separated from one another in at least one dimension of an allocated radio spectrum. According to an example, the at least one dimension may comprise at least one of carrier frequency, radio bandwidth, slots within a predefined super-frame, frames within the predefined super-frame, phase, and transmit power limits.

Optionally, a mutually exclusive part of the local cell spectrum resource entities or profiles may be designated to accommodate at least all semi-static instances of cell-specific common and control channels. As an additional option, a dynamic sharable part of the local cell spectrum resource entities or profiles may be designated to provide at least one of increased data rates and improved resource utilization by flexible use of an available spectrum.

At least one of a predetermined amount of common frequency carriers and system bandwidth may be shared by different network operators in the same service area.

The sensing at the access device may be controlled by the cellular network. As an example, the sensing may be initiated from a central control entity in response to an establishment of a connection of the access device to the central control entity. More specifically, the sensing may comprise receiving detectable physical layer cell identities of nearby cells which use the same radio access technology. However, if the sensing does not indicate any notable change in the local radio environment, a previous cell configuration profile stored in the access device may be used.

A neighborhood status information, e.g. obtained from the above sensing, may be broadcasted from active access devices. The neighborhood status information may for example be obtained based on at least one of a network configuration and a received terminal measurement report.

Other advantageous modifications are defined in the dependent claims.

BRIEF DESCRIPTION OF THE DRAWINGS

The invention will now be described in greater detail based on embodiments with reference to the accompanying drawings in which.

DESCRIPTION OF THE EMBODIMENTS

In the following, embodiments of the present invention will be described based on a multi-operator network environment.

Figure 1:
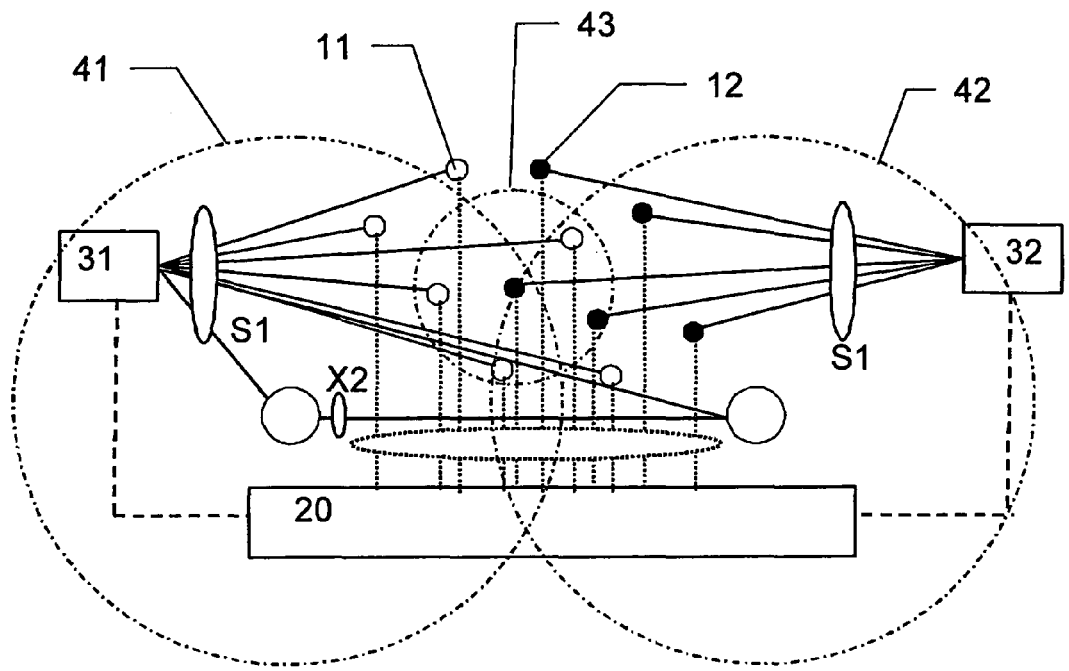
FIG. 1 shows a schematic network architecture for HNB or LNB deployment in a multi-operator FSU environment.

FIG. 1 shows a schematic network architecture with a generic deployment scenario of e.g. HNBs or LNBs 11, 12 in an advanced LTE based mobile cellular system supporting SON and/or FSU. This deployment scenario can be characterized as a multi-operator spectrum-sharing networking environment in which different networks of two different operators A (macro cell 41) and B (macro cell 42) can be based upon the same radio access technologies (RAT) operating in an overlapping or even common spectrum and also geographical service area. The HNBs or LNBs 11, 12 of the different operators A and B may be placed and set up next to each other within a short distance by their local owners in a spatially uncoordinated fashion. In FIG. 1, non-filled circles 11 indicate HNBs or LNBs of the first operator A, while filled circles or black dots 12 indicate HNBs or LNBs of the second operator B. Moreover, X2 interfaces between HNBs or between LNBs may not be available and thus should not be taken for granted in local-area deployment scenarios.

In general, sufficient coordination, either explicit or implicit or both, between network elements (e.g., neighboring HNBs or LNBs) within one network system and between different neighboring network systems in terms of network planning, deployment arrangement, network configuration, real-time and non-real-time interactions, and so forth are required for supporting optimal SON and FSU. Implicit coordination, in which coordination information is not communicated explicitly by signaling messages but inferred from the local environment, is more preferable in SON aspects. It is noted that the insertion, reset, reconfiguration or removal of a HNB or LNB is traditionally considered as a part of network planning.

According to FIG. 1, several HNBs or LNBs 11 of the first network operator A (macro cell 41) are connected via an S1 reference point to a first central network control entity 31 (e.g. a mobility management entity (MME), a pool of MMEs or any other control entity) allocated to operator A. Additionally, several HNBs or LNBs 12 of the second network operator B (macro cell 42) are connected via another S1 reference point to a second central network control entity 32 (e.g. a mobility management entity (MME) or a pool of MMEs or any other control entity) allocated to operator B. Both network control entities 31 and 32 may provide connections to respective macro NBs (not shown) which serve respective macro cells 41, 42 in or under which the HNBs or LNBs 11, 12 are located. The protocol over the S1 reference point can be enhanced Radio Access Network Application (eRANAP) and may use Stream Control Transmission Protocol (SCTP) as the transport protocol. The S1 reference point can be used for per-bearer user plane tunneling and inter-NB path switching during handover. The transport protocol over this interface may be General Packet Radio Services (GPRS) tunneling protocol-user plane (GTP-U).

According to the following embodiments, a structural framework and related cell configuration control mechanisms or procedures are proposed for providing SON and FSU, irrespective of the number of operators sharing a certain bandwidth in a service area. Focusing on handling the cell configuration upon insertion, reset, reactivation or removal of an access device (e.g. in mass deployment of plug-and-play HNBs or LNBs), it is proposed to establish an implicit coordination between cells in a local network neighborhood in term of basic cell resource allocation and sharing. This term is intended herein to cover at least all cell-specific semi-static common and control channels so as to ensure sufficient priori conflict avoidance for resolving the essential problem of inter-cell and co-channel interference. This, in turn, provides an effective means for accommodating HNBs or LNBs into the local networking environment. In contrast thereto, in conventional cellular systems explicit coordination with extensive network planning and centralized control is required for deployment of access devices causing significant overhead.

As can be gathered from FIG. 1, a limited set of so-called predefined basic cell spectrum resource (PBCSR) entities (or profiles) 20 are introduced for cell configuration in cellular systems of interests, e.g., 3GPP LTE or ITU IMT-A systems having a system bandwidth of up to, e.g., 100 MHz and supporting SON and FSU. In FIG. 1, block 20 may be replaced by a plurality of separate or discrete PBCSR entities allocated to individual cells.

The term 'basic cell spectrum resource' herein refers to the essential baseline resources needed to allocate and configure to a cell so that the cell can be up and running properly. This includes at least all the necessary structural arrangement and resource allocation of cell-specific semi-static common and control channels (e.g., channel format, transmit power, related system parameters, and so forth.) This may further include information about dedicated- and shared spectrum resources assigned to the cell to be used for other, more dynamic channels. The basic cell spectrum resource can be set and configured for a given cell upon insertion, reset or reactivation of the cell into the local networking environment by using a certain PBCSR entity 20.

The PBCSR entity 20 consumes and confines at least all cell-specific semi-static common and control channels (necessary for cell operation) to a certain part of the overall spectrum resources allocated to the network system. A limited set of PBCSR entities 20 can be designated based on frequency reuse principles in order to form a flexible reuse pattern of cell configurations which can be used among network neighborhoods to support SON. The orthogonality of this flexible reuse pattern, however, may concern only the resource allocation of cell-specific semi-static common and control channels to avoid interference problems between neighbor cells. For more dynamic channels or channel parts, possible FSU among cells can be applied. This means that it is still possible for a given cell to utilize the entire of the system spectrum or bandwidth if allowed.

In FIG. 1, a local circular range 43 is depicted as a range of a respective node located at the center of the local circular range 43 for neighbor discovery and self-configuration initiative, as explained later.

Figure 2:
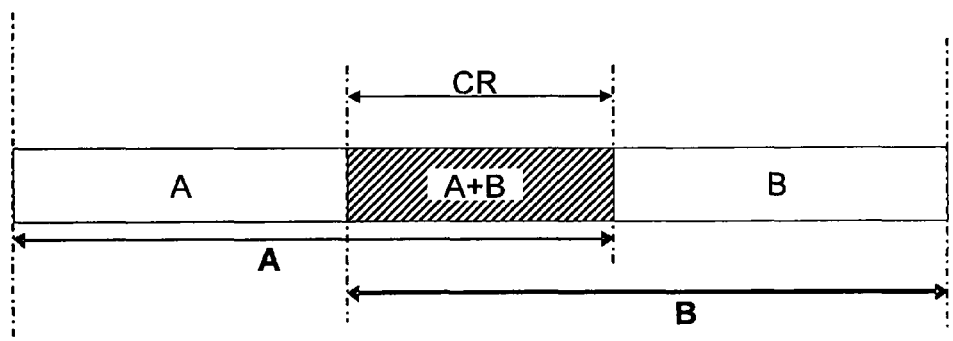
FIG. 2 shows a schematic diagram indicating spectrum allocation in a multi-operator environment.

FIG. 2 shows a schematic diagram indicating spectrum allocation in the multi-operator environment of FIG. 1. The overall available spectrum resource or range corresponds to the horizontal width of the diagram. This overall available spectrum is partly shared between operators A and B as indicated by the arrows A and B at the bottom of the diagram. The left white portion of the bar corresponds to a spectrum range exclusively allocated to operator A, while the right white portion of the bar corresponds to a spectrum range exclusively allocated to operator B. The hatched overlap portion at the center of the bar corresponds to a portion of the overall spectrum, which is shared by both operators A and B. The overlap portion is a potential contention and local outage region and is indicated in FIG. 2 by an arrow CR.

In general, the overall spectrum resources allocated to the system including the system bandwidth and carriers can be divided into a certain number of PBCSR entities 20 in a predefined fashion. These PBCSR entities 20 are separated from one another in at least one dimension of the allocated radio spectrum, such as for example frequency (e.g., carriers or radio band resources), time (e.g., slots or frames within a predefined super-frame or phase of the network system), or power (e.g., transmit power limits on the basis of cell-specific common and control channels, assigned radio band resources). The number of designated PBCSR entities 20 and the separation between them should be sufficient enough so that the PBCSR entities 20 provide enough resources to satisfy RAT baseline system requirements, that there are enough different PBCSR entities 20 to assign (and reuse) for any sizable group of neighbor cells, and that any two neighbor cells which are assigned with two different PBCSR entities 20 can operate sufficiently with tolerable inter-cell and co-channel interference.

Figure 3:
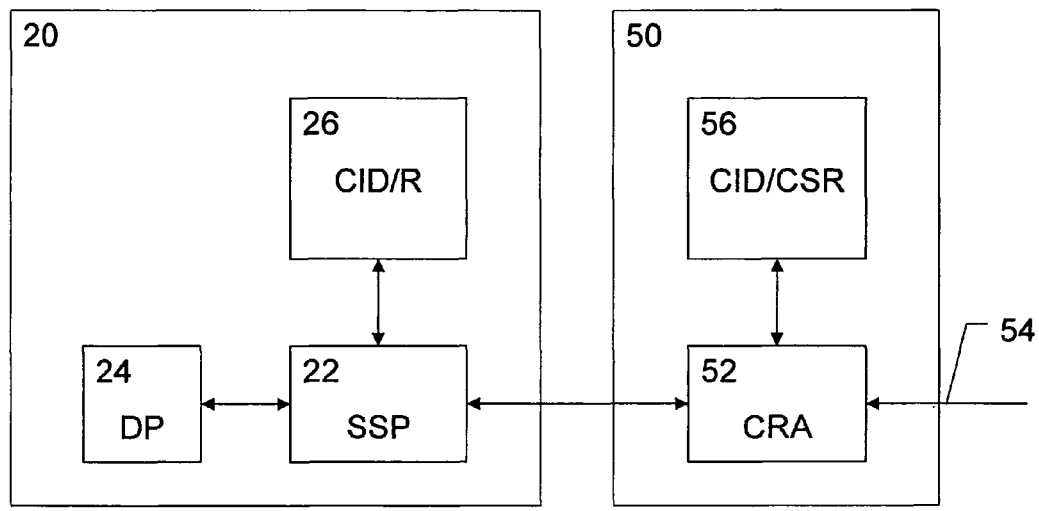
FIG. 3 shows a schematic block diagram of a cell spectrum resource entity and a central control entity according to a first embodiment.

FIG. 3 shows a schematic block diagram of a PBCSR entity 20 and a central control entity 50 according to a first embodiment. The central control entity 50 may correspond to the network control entities 31, 32 of FIG. 1.

The PBCSR entity 20 can have a unique identity assigned. For implementation alternatives, the PBCSR entities 20 may consist of a mutually exclusive semi-static part (SSP) 22 (based on e.g. an orthogonal frequency and/or time division) and a dynamic sharable part (DP) 24 (which can be adapted to allocate or configure the rest of the available system bandwidth or spectrum resources seen by a given cell). The mutually exclusive semi-static part 22 of the PBCSR entity 20 may be adapted or designated to accommodate at least all semi-static instances of cell-specific common and control channels. The dynamic sharable part 24 of the PBCSR entity 20 may be adapted to provide highest possible data rates and optimal resource utilization by means of efficient FSU. Furthermore, a storage unit (e.g. look-up table (LUT) or the like) 26 is provided to store information about cell identities (CIDs) of served access devices (e.g. LNBs or HNBs) and their assigned cell resources.

The central control entity 50 comprises a cell resource assignment (CRA) function or unit 52 which is adapted to assign a PBCSR entity 20 to a CID received from an access device (e.g. LNB or HNB) in an initial assignment request 54. A mapping between CIDs and identities of assigned PBCSR entities is stored in a storage unit (e.g. look-up table (LUT) or the like) 56.

The DP 24, the SSP 22 and the CRA unit 202 may be implemented as discrete analog or digital hardware circuits or as a software controlled central processing unit (CPU) or any other processor device.

The introduction of the set of PBCSR entities 20 based on the proposed PBCSR division allows a basic cell configuration which is quick, operator-independent and common to all operators sharing the overall network resources. This provides an implicit coordination between same RAT systems of different operators which is necessary for mass deployment scenarios of HNBs or LNBs as depicted in FIG. 1. As already mentioned, different operators A and B are allowed to share a certain amount of common frequency carriers and system bandwidth in the same service area.

Figure 4:
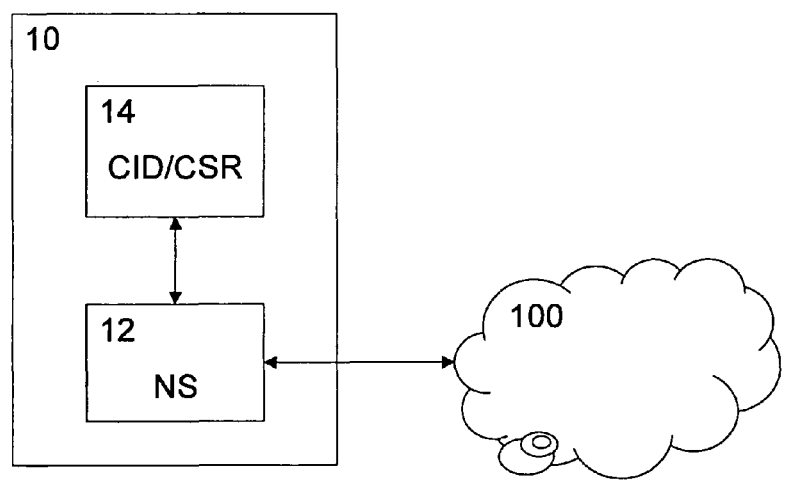
FIG. 4 shows a schematic block diagram of an access device according to the first embodiment.

FIG. 4 shows a schematic block diagram of an access device (e.g. LNB or HNB) 10 according to the first embodiment.

In order to facilitate SON with plug-and-play access devices (in mass deployment of HNB and LNB in local-area scenarios), it is proposed that the access device 10 is able to sense local network neighborhood and detect potential neighbor cells. To achieve this, a network sensing (NS) function or unit 12 is provided for performing or controlling the sensing procedure. Additionally, mapping between a served PLCID (i.e. sensing quantity or range) and an assigned PBCSR entity 20 and/or unused and thus available mapping relationships can be stored in a respective storing unit (e.g. look-up table (LUT) or the like) 14. The mapping relation between PBCSR and essential access device sensing quantity such as PLCID ensures that the PLCID assigned to a given cell also identifies the PBCSR entity 20 used for cell configurations. This mapping between PLCID and PBCSR entity 20 may be a mutually exclusive many-to-one relation. Both PLCID and PBCSR unit 20 need to be unique among neighbor cells or cells within a certain local network neighborhood, such as the range 43 in FIG. 1.

Network sensing can be initiated upon e.g. insertion, reset, reactivation, or major reconfiguration of the access device 10, and can be configured and controlled by the network 100 (e.g., initiated from a central control entity such as MME, network O&M or a radio resource management (RRM) server as soon as the access device 10 has got connected to it). The network 100 may configure e.g. triggering conditions, rules or instructions for selective measurements, timing and reporting formats.

The network sensing unit 12 of the access device 10 may, for example, measure and receive all detectable physical layer cell identities (PLCID) of nearby cells using the same RAT, e.g., 3GPP LTE system. The PLCID may be sent in downlink as a cell-reference-and-synchronization signal and may correspond to a unique combination of an orthogonal sequence and a pseudo-random sequence. It is noted that the use of identical PLCID by two spatially overlapped cells may result in severe identity and interference problems which disturb network operation. The network sending unit 12 may be adapted to use more advanced sensing capabilities such as channel quality or interference measurement in certain selective radio bands, measurement of other coexisting RATs, and so forth.

To enhance sensing of the network sensing unit 12 further, an optional broadcast service of local network neighborhood information or neighborhood status information can be introduced for an active access device operating in a certain network neighborhood. This means that the active access device 10 may broadcast its awareness of the local network neighborhood (e.g., its neighbor cell list and their detectable characteristics). This neighborhood status information can be updated based on network configuration and active terminal measurement reports received from the network 100. The access device 10 may select during the sensing phase to read this kind of broadcast information from its detected potential neighbor(s) to learn more about the local networking environment and to avoid a conflict situation.

It is noted that the hardware functionalities underlying the block diagrams of FIGS. 3 and 4 may be implemented as a chip device, e.g., integrated on a single chip or a chip set.

Figure 5:
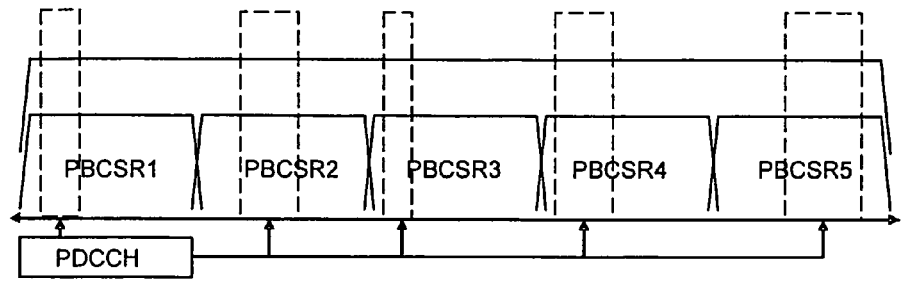
FIG. 5 shows a schematic diagram indicating an example of a flexible reuse pattern for overall spectrum resources.

FIG. 5 shows an example of designing such a flexible reuse pattern consisting of five different PBCSR entities PBCSR1 to PBCSR5. The upper resource range (e.g. bandwidth) corresponds to the overall available spectrum range, and the lower partial ranges correspond to a case where the overall available spectrum range is equally divided among the five different PBCSR entities PBCSR1 to PBCSR5. The hatched bars indicate a possible data channel scheduling (Physical downlink control channel (PDCCH) to one terminal device or user equipment (UE). Hence, the overall available spectrum range can be made available for a single UE.

In the following, the PBCSR entities PBCSR1 to PBCSR5 are described in more detail based on more concrete examples (e.g. as an implementation example). For example, as mentioned above, operating HNBs or LNBs are allowed to 'expand' their cell resources so that all available resources can be shared (if needed) between operational HNBs or LNBs with regard to their assigned PBCSR entities. Furthermore, resources may be released when a new HNB or LNB is commissioned, so that a PBCSR entity can be assigned, e.g., between networks.

It is assumed that the total system resources are given by a two-dimensional table with time-dependent columns (i.e. horizontal time dimension) and frequency-dependent rows (i.e. vertical frequency dimension), common to all local systems of interests. Each resource element block is indexed with ij for f(i) and t(j), i={1, ..., N} and j={1, ..., M}.

According to a first example which is based on time division, PBCSR1 can be defined by the following notion:

$$F=\{f(i) \text{ for all } i\}, T=\{t(1), t(L), t(L+1), \ldots, t(M)\},$$

where cell-specific semi-static common and control channels are confined and transmitted in t(1); more dynamic or user-specific channels are transmitted in the left-over part of t(1) and {t(L), t(L+1) ..., t(M)} in controlled or scheduled fashion.

Similarly, PBCSR(L−1) can be defined by the following notion:

$$F=\{f(i) \text{ for all } i\}, T=\{t(L-1), t(L), t(L+1), \ldots, t(M)\},$$

where cell-specific semi-static common and control channels are confined and transmitted in t(L−1); more dynamic or user-specific channels are transmitted in the left-over part of t(L−1) and {t(L), t(L+1) ..., t(M)} in controlled or scheduled fashion.

Thus, {t(L), t(L+1), ..., t(M)} is common shared resources according to the adopted FSU scheme. To ensure that the cell can be set up and running first and at highest peak rate, this division is certainly not optimum, as there will always be some resource unused or wasted, proportional to the number of PBCSR entities. But this allows for switching off a HNB or LNB to be effortless. That is, no special tasks are required to reclaim resources.

Mapping between PBCSR identity and PLCID can for example be predefined as follows:

{PLCID1, ...,PLCIDk}=>PBCSR1

.....

{PLCIDy, ....,PLCIDY}=>PBCSRL

According to a second example which is based on frequency division, PBCSR1 can be defined by the following notion:

$$F=\{f(1), \text{ and the rest for all } i\}, T=\{t(j) \text{ for all } j\},$$

where cell-specific semi-static common and control channels are confined and transmitted in f(1); more dynamic or user-specific channels are transmitted in the left-over part of f(1) and the rest in controlled or scheduled fashion.

Similarly, PBCSRK can be defined by the following notion:

$$F=\{f(K), \text{ and the rest for all } i\}, T=\{t(j) \text{ for all } j\},$$

where cell-specific semi-static common and control channels are confined and transmitted in f(K); more dynamic or user-specific channels are transmitted in the left-over part of f(K) and the rest in controlled or scheduled fashion.

Thus, in this case the entire of system resources can be utilized and shared, provided that the scheduling of more dynamic or user-specific channels must respect the transmission of other-cell common and control channels at the first place. This again does not requires any special treatments in regard to the switching off issue of HNB or LNB.

Further examples can be based on e.g. more sophisticated hybrid time and/or frequency divisions.

In the following, two alternative procedures for PLCID and PBCSR assignment for cell configuration upon cell initial setup, reset or reactivation is described with reference to FIGS. 6 and 7.

Figure 6:
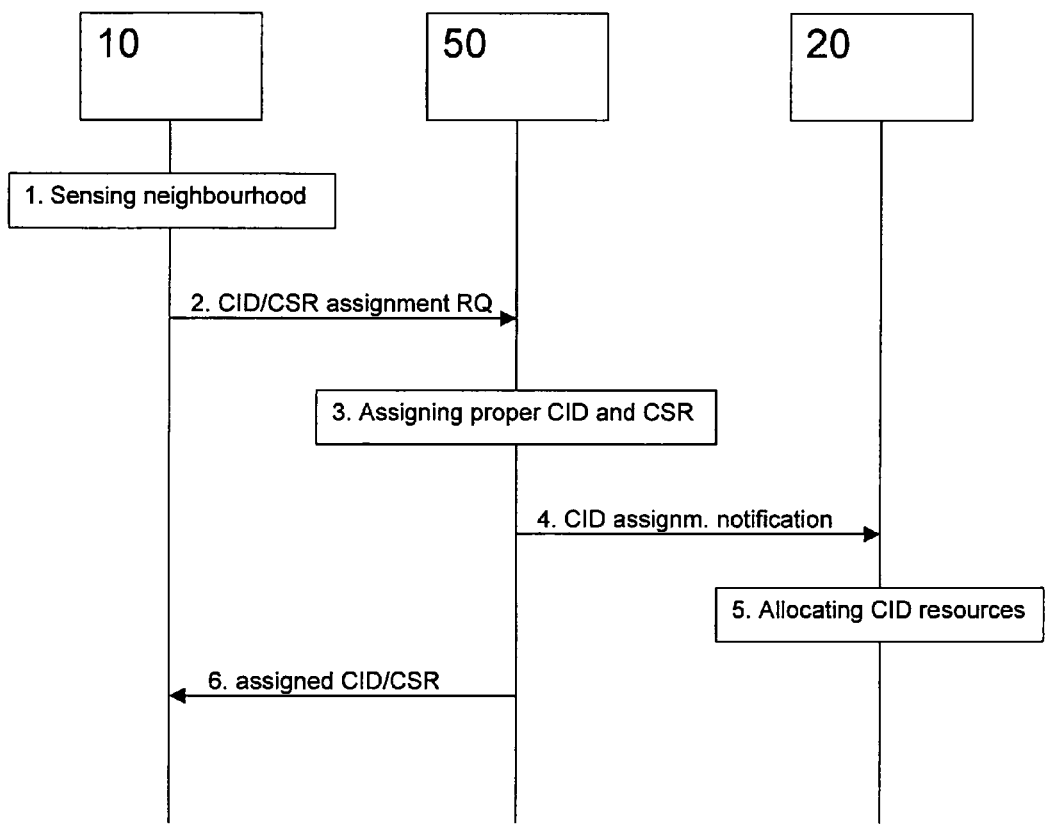
FIG. 6 shows a schematic processing and signaling diagram of a cell configuration procedure according to the first embodiment.

FIG. 6 shows a schematic processing and signaling diagram of a cell configuration procedure according to the first embodiment. In the diagram, conveyance or forwarding of signaling messages is depicted as an arrow, while processing at a concerned network element is depicted as a box arranged below the respective network element which performs the activity indicated in the box. Time proceeds in the downward direction.

In step 1, the access device 10 initiates a sensing of the radio environment in the neighborhood. Then, in step 2, a request for assignment of a PLCID and a PBCSR is issued by the access device 10 and forwarded to the central control entity 50. The assignment request includes sensing results (e.g. detected PLCID(s) and neighborhood status information, or the like) obtained in step 1. In step 3, the central control entity assigns a proper PLCID and PBCSR to the requesting access device based on the received sensing results. In step 4, the assigned PBCSR entity 20 is notified about its assignment to the PLCID. In response thereto, the PBCSR entity 20 allocates suitable cell spectrum resources to the PLCID in step 5. Finally, in step 6, the central control entity 50 responds to the access device 10 with the assigned PLCID, global CID and PBCSR. Apparently, step 6 may as well be reordered to be performed prior to step 4.

Thus, in the first embodiment, the access device 10 indicates the sensing results, e.g., detected PLCID(s) and neighborhood status information after sensing, to the network 100 to request for assignment of PLCID and PBCSR.

Figure 7:
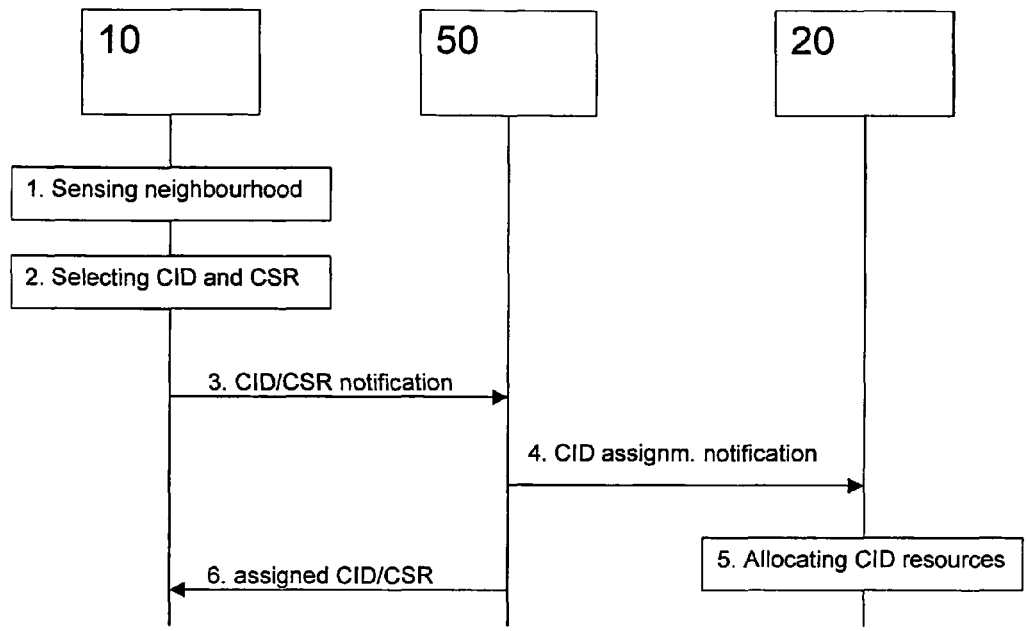
FIG. 7 shows a schematic processing and signaling diagram of a cell configuration procedure according to a second embodiment.
Figure 8:
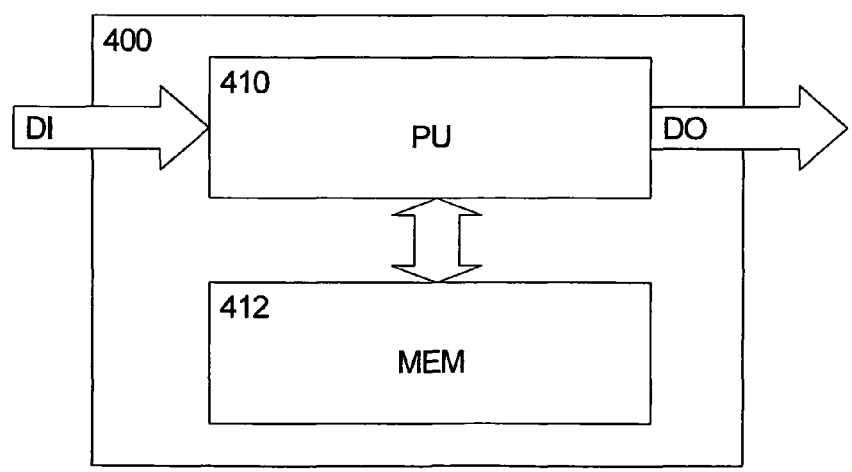
FIG. 8 shows a schematic block diagram of software-based implementation according to a third embodiment.

FIG. 7 shows a schematic processing and signaling diagram of a cell configuration procedure according to a second embodiment, where the access device performs self-selection of PLCID and PBCSR.

Based on the sensing results obtained in an initial sensing step 1, the access device 10 selects in step 2 a PLCID from an unused set of predefined PLCIDs and PBCSR mapped on the selected PLCID. This mapping relationship can be stored for example in the storing unit 14 of FIG. 4. The access device then optionally notifies and confirms the selected PLCID and PBCSR with towards network (e.g. to the central control entity 50) in step 3 to get the final PLCID, PBCSR and global cell ID configured from the network. In step 4, the assigned PBCSR entity 20 is notified about its assignment to the PLCID. In response thereto, the PBCSR entity 20 allocates suitable cell spectrum resources to the PLCID in step 5. Finally, in step 6, the central control entity 50 responds to the access device 10 with the assigned PLCID, global CID, and PBCSR. Again, step 6 may as well be reordered to be performed prior to step 4.

It is noted that in the case of cell reactivation, e.g., from a standby state, the proposed neighborhood sensing can be carried out right after the reactivation being triggered. In case the access device 10 does not detect notable changes in the radio environment compared to the last detected status, it may use the last stored cell configuration profile for a fast cell reactivation. The access device may then indicate and confirm this to the network 100. For a safer but more time- and resource-consuming alternative, the cell reactivation may follow the steps applied for the cell start-up or reset procedures shown in FIGS. 6 and 7.

Thus, in the proposed cell configuration method for supporting SON and FSU in cellular systems of interests (as depicted in FIG. 1), upon insertion, reactivation, reset etc. of an access device or base station device (e.g. HNB or a LNB) to a local network, the inserted access device first senses the local radio environment for a sufficient period of time. More specifically, a given access device may be adapted to scan, measure, and detect all possible neighbor cells, of course, within its configured sensing range (e.g. range 43 of FIG. 1) and RAT detection capability. It is assumed that at least all the RATs that are involved in FSU are detectable to the access device. To the detected neighbor cells of the same RAT as of the given access device, the NB receives e.g. their PLCIDs or other designated reference signals mapped on their PBCSR identities. The access device may also select to read the broadcast neighborhood status information of some detected neighbor cell(s) if this is supported. In the first embodiment, the access device may then feed the sensing results back to the central network control entity 50, (e.g. MME or control gateway or RRM server or network O&M server or the like), in a request for PLCID and PBCSR assignment. The network examines the feedback from the initiated access device, selects, and assigns proper PLCID and PBCSR identity to the access device in response. In the alternative second embodiment, the access device may be allowed to select PLCID and PBCSR identity by itself. This however may be constrained to predefined rules and value sets pre-assigned by the network. During active operation of the access device, PLCID and PBCSR identity can be reconfigured if needed due to e.g. assignment conflict or serious interference detected based upon advanced UE measurements or network monitoring statistics.

FIG. 10 shows a schematic block diagram of an alternative software-based implementation according to a third embodiment. The required functionalities can be implemented in any network entity 400 (which may be provided in the access device 10, the central control entity 50 or the PBCSR entity 20) with a processing unit 410, which may be any processor or computer device with a control unit which performs control based on software routines of a control program stored in a memory 412. The control program may also be stored separately on a computer-readable medium. Program code instructions are fetched from the memory 412 and are loaded to the control unit of the processing unit 410 in order to perform the processing steps of the above device-specific functionalities described in connection with FIGS. 3, 4, 6, and 7, which may be implemented as the above mentioned software routines. The processing steps may be performed on the basis of input data DI and may generate output data DO. In case of the access device 10, the input data DI may correspond to the sensed neighborhood status information or PLCID(s) of neighbor cells, and the output data DO may correspond to the assignment request (FIG. 6) or notification (FIG. 7). In case of the central control device 5*o*, the input data DI may correspond to the notification received from the access device 10, and the output data DO may correspond to the assignment notification. In case of the PBCSR entity 20, the input data DI may correspond to the assignment notification received from the central control device 50, and the output data DO may correspond to the allocated cell resources.

Consequently, the functionalities of the above embodiments of the access device 10, central control device 50 and PBCSR entity 20 may be implemented as a computer program product comprising code means for generating each individual step of the signaling procedures for the respective entity when run on a computer device or data processor of the respective entity.

In summary, methods and apparatuses for controlling cell configuration in a cellular network have been described, wherein a cell identity and a local cell spectrum resource entity or profile are assigned to an access device in response to a result of sensing a local radio environment at said access device to detect possible neighbor cells. The assigned local cell spectrum resource entity or profile is used to allocate cell spectrum resource from a shared multi-operator spectrum to said access device.

It is apparent that the invention can easily be extended to any service and network environment and is not restricted to the UMTS or LTE technology area and in particular not to HNBs or LNBs. The proposed embodiments can be implemented in connection with any cell configuration at a base station or access device deployed in a cellular or wireless network. The embodiments may thus vary within the scope of the attached claims.

The invention claimed is:

1. A method of controlling cell configuration in a cellular network, said method comprising:
    assigning a cell identity and a local cell spectrum resource entity or profile to an access device in response to determining a local radio environment to detect possible neighbor cells;
    wherein said assigned local cell spectrum resource entity or profile includes a semi-static part that is exclusive to the access device and a dynamic shareable part to enable allocation of cell spectrum resource to said access device depending on the local radio environment operable to establish implicit coordination between local cells of the cellular network based on the local radio environment, and to allocate cell spectrum resource from a shared multi-operator spectrum to said access device based on both the semi-static part and the dynamic shareable part, wherein the local cell spectrum resource entity or profile is selected from a limited set of predefined basic cell spectrum resource entities or profiles provided for cell configuration of the cellular network, and the semi-static part accommodates semi-static instances of common and control channels specific to the access point and the dynamic shareable part is adapted to allocate the available system bandwidth or spectrum resources seen by the local access point.

2. The method according to claim 1, further comprising initiating said sensing and assigning upon at least one of insertion, reset, reactivation, and removal of an access device.

3. The method according to claim 2, wherein said sensing is controlled by said cellular network.

4. The method according to claim 3, further comprising initiating said sensing from a central control entity in response to an establishment of a connection of said access device to said central control entity.

5. The method according to claim 3, wherein said sensing comprises receiving detectable physical layer cell identities of nearby cells which use the same radio access technology.

6. The method according to claim 2, further comprising using a previous cell configuration profile stored in said access device, if said sensing does not indicate any notable change in said local radio environment.

7. The method according to claim 1, wherein said cell spectrum resource comprises at least structural arrangement and resource allocation of cell-specific common and control channels.

8. The method according to claim 7, wherein said cell spectrum resource comprises at least one of channel format, transmit power, system parameters, and information about dedicated and shared spectrum resources assigned to a cell of said access device.

9. The method according to claim 1, further comprising designating said local cell spectrum resource entity or profile based on frequency reuse principles.

10. The method according to claim 1, wherein resource allocation to said local cell spectrum resource entity or profile allows utilization of an entire system spectrum or bandwidth at a given cell.

11. The method according to claim 1, further comprising separating local cell spectrum resource entities or profiles from one another in at least one dimension of an allocated radio spectrum.

12. The method according to claim 11, wherein said at least one dimension comprises at least one of carrier frequency, radio bandwidth, slots within a predefined super-frame, frames within the predefined super-frame, phase, and transmit power limits.

13. The method according to claim 1, further comprising designating the semi-static exclusive part of said local cell spectrum resource entities or profiles to accommodate at least all semi-static instances of cell-specific common and control channels.

14. The method according to claim 1, further comprising designating the dynamic sharable part of said local cell spectrum resource entities or profiles to provide at least one of increased data rates and improved resource utilization by flexible use of an available spectrum.

15. The method according to claim 1, further comprising sharing at least one of a predetermined amount of common frequency carriers and system bandwidth by different network operators in the same service area.

16. The method according to claim 1, further comprising broadcasting a neighborhood status information from active access devices.

17. The method according to claim 16, further comprising updating said neighborhood status information based on at least one of a network configuration and a received terminal measurement report.

18. A non-transitory computer program product comprising code means for producing the steps of method claim 1 when run on a computer device.

19. A method of controlling cell configuration in a cellular network, said method comprising:
Providing to an access point a local cell spectrum resource entity or profile including a semi-static part that is exclusive to an access device and a dynamic shareable part to enable allocation of cell spectrum resource depending on a sensed local radio environment operable to establish implicit coordination between local cells of a cellular network based on the local radio environment, and allocating cell spectrum resource from a shared multi-operator spectrum based on both the semi-static part and the dynamic shareable part, wherein the local cell spectrum resource entity or profile is selected from a limited set of predefined basic cell spectrum resource entities or profiles provided for cell configuration of the cellular network, and the semi-static part accommodates semi-static instances of common and control channels specific to the access point and the dynamic shareable part is adapted to allocate the available system bandwidth or spectrum resources seen by the local access point;
receiving at said local cell spectrum resource entity or profile an information indicating a cell identity assigned to said access device; and
assigning cell spectrum resource at said local cell spectrum resource entity or profile to said cell identity.

20. An apparatus, comprising:
one or more processors; and
one or more memories including computer program code,
the one or more memories and the computer program code configured to, with the one or more processors, cause the apparatus to perform at least the following:
assigning a cell identity and at least one of a plurality of local cell spectrum resource entities or profiles to an access device in response to determining an indication of possible neighbor cells of a local radio environment of said access device;
wherein said assigned local cell spectrum resource entity includes a semi-static part that is exclusive to the access device and a dynamic shareable part to enable allocation of cell spectrum resource to said access device depending on the local radio environment operable to establish implicit coordination between local cells of the cellular network based on the local radio environment, and to allocate cell spectrum resource from a shared multi-operator spectrum to said access device based on both the semi-static part and the dynamic shareable part, wherein the local cell spectrum resource entity or profile is selected from a limited set of predefined basic cell spectrum resource entities or profiles provided for cell configuration of the cellular network, and the semi-static part accommodates semi-static instances of common and control channels specific to the access point and the dynamic shareable part is adapted to allocate the available system bandwidth or spectrum resources seen by the local access point.

21. The apparatus according to claim 20, wherein said apparatus is adapted to allow utilization of an entire system spectrum or bandwidth at a given cell.

22. The apparatus according to claim 20, wherein assignable cell spectrum resource is separated between different ones of said plurality of local cell spectrum resource entities or profiles in at least one dimension of an allocated radio spectrum.

23. The apparatus according to claim 22, wherein said at least one dimension comprises at least one of carrier frequency, radio bandwidth, slots within a predefined super-frame, frames within the predefined super-frame, phase, and transmit power limits.

24. A central resource control device comprising an apparatus according to claim 20.

25. An apparatus, comprising one or more processors; and one or more memories including computer program code,
the one or more memories and the computer program code configured to, with the one or more processors, cause the apparatus to perform at least the following:
assigning local cell spectrum resource to an access device in response to the receipt of a notification from a central resource control entity indicating assignment of a cell identity to said access device, wherein said assigned local cell spectrum resource includes a semi-static part that is exclusive to the access device and a dynamic shareable part to enable allocation of cell spectrum resource to said access device depending on a local radio environment operable to establish implicit coordination between local cells of a cellular network based on the local radio environment, and to allocate cell spectrum resource from a shared multi-operator spectrum to said access device based on both the semi-static part and the dynamic shareable part, wherein the local cell spectrum resource entity or profile is selected from a limited set of predefined basic cell spectrum resource entities or profiles provided for cell configuration of the cellular network, and the semi-static part accommodates semi-static instances of common and control channels specific to the access point and the dynamic shareable part is adapted to allocate the available system bandwidth or spectrum resources seen by the local access point.

26. The apparatus according to claim 25, wherein said assigning means comprise a mutually exclusive part designated to accommodate at least all semi-static instances of cell-specific common and control channels.

27. The apparatus according to claim 25, wherein said assigning means comprise a dynamic sharable part designated to provide at least one of increased data rates and improved resource utilization by flexible use of an available spectrum.

28. A local cell spectrum resource entity comprising an apparatus according to claim 25.

\* \* \* \* \*